Sept. 29, 1953 A. C. FREIRE 2,653,407
FISHING DEVICE
Filed Jan. 5, 1951

INVENTOR.
Antonio Cunha Freire
BY

Patented Sept. 29, 1953

2,653,407

UNITED STATES PATENT OFFICE 2,653,407

FISHING DEVICE

Antonio Cunha Freire, Sao Paulo, Brazil

Application January 5, 1951, Serial No. 204,547
In Brazil January 13, 1950

3 Claims. (Cl. 43—36)

The present invention relates to fishing devices, and more particularly to a trigger arrangement for tensioned fish hooks.

It is the object of the present invention to provide a fishing device in which tensioned fish hooks are released to strike a fish touching the device, regardless of the direction in which the fish contacts the device.

With this object in view, the present invention mainly consists in a fishing device comprising, in combination, the following elements: A guiding member, a hook member, a trigger rod, and a coil spring. The guiding member has two spaced plate portions, each of the plate portions being formed with a hole. The trigger rod is longitudinally slidably mounted in the hole of one plate portion and has an eyelet to which the fishing line is secured. The hook member is mounted on the same plate portion and movable between a tensioned position and a released position. The trigger rod holds the hook member in tensioned position, and releases the hook member when moved relatively to the same. The coil spring passes through the hole in the other plate portion, and the fishing line passes through the interior of the coil spring, so that the trigger rod is pulled by the fishing line to a releasing position when a fish strikes the device, and the coil spring swings resiliently and takes along the fishing line which is forced to follow the curves of the coil spring.

The novel features of the invention are set forth in the appended claims. The invention itself will be best understood from the following description of a specific embodiment when read in connection with the accompanying drawing in which:

Figure 1:
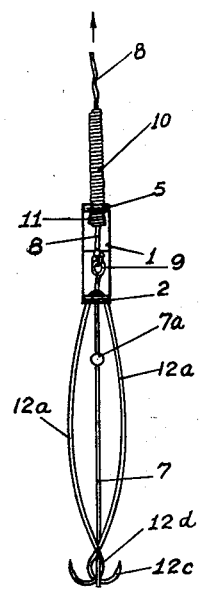
Fig. 1 is a front view of the fishing device according to a preferred embodiment of the present invention.
Figure 2:
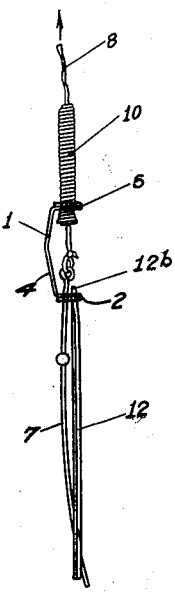
Fig. 2 is a side view of Fig. 1.
Figure 3:
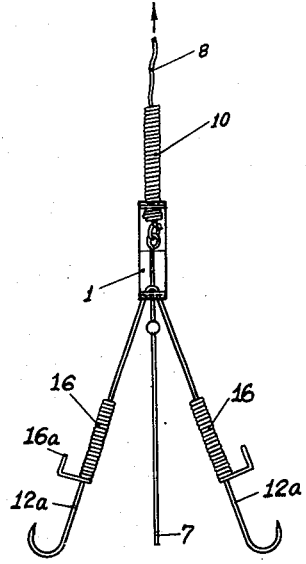
Fig. 3 is a front view of a modified embodiment.
Figure 4:
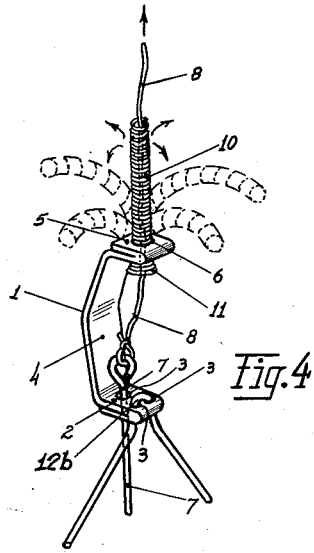
Fig. 4 is an isometric view of a detail.

Referring now to the drawing, and more particularly to Figs. 1, 2 and 4, a guiding member 1 has two parallel spaced plate portions 2 and 5 connected by a plate 4. The plate portion 2 is formed with three holes 3. A V-shaped resilient hook member 12 has an apex portion 12b and two leg portions 12a ending in hook portions 12c. The leg portions 12a pass through two of the holes 3 in the plate portion 2 so that the apex portion 12b is located between the plate portions. The resilient wire member 12 can be manually compressed to the compressed position shown in Fig. 1 in which the leg portions 12a and the hook portions 12c cross each other at two points and define a loop 12d. However, the member 12 resiliently tends to assume the position shown in Fig. 3.

The trigger rod 7 passes through the third hole 3 in the plate portion 2, as best seen in Fig. 4, and is provided with an eyelet 9 to which a fishing line 8 is attached. The trigger rod 7 is movable between a locking position passing through the loop 12d, as shown in Fig. 1, and a releasing position disengaged from member 12 as shown in Fig. 3.

A coil spring 10 passes through the hole 6 in the plate member 5 and is provided with a flared end portion 11 constituting a holding means for holding the end of the coil spring 10 between the plate portions 2 and 5. The length of the coil spring 10 is greater than distance between the plate portions 2 and 5 so that the other end of the coil spring cannot slip out of hole 6.

When the hook member 12 is moved relatively to the trigger rod 7, the end of the trigger rod 7 slips out of the loop 12d into a releasing position whereby the leg portions 12a are released and resiliently spring to the position shown in Fig. 3 for striking a fish. The movement of the trigger rod 7 is limited by a member 7a which engages the plate member 5 when the trigger rod 7 is in releasing position.

The trigger arrangement according to the present invention operates the trigger rod in the event that the fish strikes the device in lateral direction. Any jolt will cause the coil spring 10 to swing laterally as indicated in broken lines in Fig. 4, so that the fishing line 8 will be forced to follow the curves of the coil spring and a greater length of fishing line will be enclosed in the coil spring so that the fishing line will pull the trigger rod 7 to its releasing position freeing the legs 12a and hooks 12c for rapid outward movement.

Figure 5:
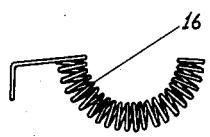
Fig. 5 is a front view of an element of the modified embodiment shown in Fig. 3.

In the modified embodiment shown in Fig. 3, small coil springs 16 are slidably mounted on the leg portions 12a and provided with hooks 16a which facilitate the attaching of a bait to the device. When the small coil springs 16 are removed from the device they assume the curved shape shown in Fig. 5, so that they resiliently engage the leg portions 12a in the position shown in Fig. 3 and remain in any position in which they are placed on the leg portions 12a.

While the invention has been illustrated and described as embodied in a trigger arrangement for the release of a V-shaped hook member it is not intended to be limited to the details shown, since various modifications may be made without departing from the spirit of the present invention.

What is claimed as new is:

1. A fish hook comprising, in combination, a guiding member having two parallel spaced plate portions, one of said plate portions being formed with one hole and the other of said plate portions being formed with three holes; a V-shaped resilient wire member having two straight leg portions ending in outwardly directed hook portions adapted to overlap when said leg portions are pressed towards each other into a compressed position, said two leg portions in said compressed position crossing each other in one crossing point, and said two hook portions crossing each other in another crossing point located farther from the apex of said V-shaped wire member so as to define a loop, said V-shaped resilient wire member having the apex thereof located between said two plate portions with said two leg portions passing through two of said three holes in said other plate member; an elongated resilient rod passing through the third hole in said other plate portion and being longitudinally slidable therein between a locking position and a releasing position, and in said locking position having one end portion passing through said loop formed by the leg portions of said V-shaped wire member in said compressed position of the same and engaging said hook portions at said crossing point of the same so as to lock said V-shaped wire member in said compressed position, the other end portion of said rod being located between said plate portions and formed with an eyelet adopted to be secured to the end of a fishing line passing through said one hole in said one plate portion; a coil spring passing through said one hole and having a length greater than the distance between said plate portions and adapted to permit passing of said fishing line through the interior thereof; and means for holding one end portion of said coil spring between said plate portions.

2. A fish hook comprising, in combination, a guiding member having two parallel spaced plate portions, one of said plate portions being formed with one hole and the other of said plate portions being formed with three holes; a V-shaped resilient wire member having two straight leg portions ending in outwardly directed hook portions adapted to overlap when said leg portions are pressed towards each other into a compressed position, said two leg portions in said compressed position crossing each other in one crossing point, and said two hook portions crossing each other in another crossing point located farther from the apex of said V-shaped wire member so as to define a loop, said V-shaped resilient wire member having the apex thereof located between said two plate portions with said two leg portions passing through two of said three holes in said other plate member; an elongated resilient rod passing through the third hole in said other plate portion and being longitudinally slidable therein between a locking position and a releasing position, and in said locking position having one end portion passing through said loop formed by the leg portions of said V-shaped wire member in said compressed position of the same and engaging said hook portions at said crossing point of the same so as to lock said V-shaped wire member in said compressed position, the other end portion of said rod being located between said plate portions and formed with an eyelet adapted to be secured to the end of a flashing line passing through said one hole in said one plate portion; and a coil spring passing through said one hole and having a length greater than the distance between said plate portions and having one end portion thereof located between said plate portions and outwardly flared for holding said end portion between said plate portions, said coil spring being adapted to permit passing of said fishing line through the interior thereof.

3. A fish hook comprising, in combination, a guiding member having two substantially parallel spaced plate portions, one of said plate portions being formed with one hole and the other of said plate portions being formed with at least one hole; a trigger rod longitudinally slidably mounted in said one hole of said other plate portion and movable between a holding position and a releasing position, said trigger rod having an eyelet located between said plate portions and adapted to be secured to a fishing line; a hook member mounted on said other plate portion and movable between a tensioned position and a released position, said trigger rod holding said hook member in said tensioned position when in said holding position, and releasing said hook member when in said releasing position; a coil spring passing through said one hole in said one plate portion and having a length greater than the distance between said plate portions and adapted to permit passing of said fishing line through the interior thereof; and means for holding one end of said coil spring between said plate portions.

ANTONIO CUNHA FREIRE.

References Cited in the file of this patent

UNITED STATES PATENTS

| Number | Name | Date |
|---|---|---|
| 13,081 | Cook | June 19, 1855 |
| 321,796 | Clark | July 7, 1885 |
| 712,497 | Coffin | Nov. 4, 1902 |
| 1,066,392 | Englund | July 1, 1913 |
| 1,296,866 | Skretting | Mar. 11, 1919 |
| 1,700,831 | Downing | Feb. 5, 1929 |
| 2,311,832 | Helfenstein | Feb. 23, 1943 |
| 2,357,716 | Bellamy et al. | Sept. 5, 1944 |
| 2,485,728 | Gardner | Oct. 25, 1949 |